United States Patent [19]

Wheeler

[11] Patent Number: 4,544,440
[45] Date of Patent: Oct. 1, 1985

[54] METHOD OF MANUFACTURING AN EMBOSSED PRODUCT

[76] Inventor: Robert G. Wheeler, 3927 Clarence Cir., Corvallis, Oreg. 97330

[21] Appl. No.: 186,851

[22] Filed: Sep. 15, 1980

Related U.S. Application Data

[63] Continuation of Ser. No. 35,278, May 2, 1979, abandoned, which is a continuation of Ser. No. 832,111, Sep. 12, 1977, abandoned.

[51] Int. Cl.⁴ .................. B32B 31/06; B32B 31/16; B32B 31/20
[52] U.S. Cl. .................. 156/634; 156/645; 156/659.1; 156/664; 156/219; 156/250; 156/581
[58] Field of Search ............ 156/219, 251, 581, 634, 156/633, 659.1, 664, 250, 645

[56] References Cited

U.S. PATENT DOCUMENTS

| | | | |
|---|---|---|---|
| 2,672,176 | 3/1954 | Lyijynen | 156/581 |
| 2,854,336 | 9/1958 | Gutknecht | 156/659.1 |
| 2,988,838 | 6/1961 | Morgan | 156/634 |
| 3,020,186 | 2/1962 | Lawrence | 156/251 |
| 3,474,706 | 10/1969 | Wheeler | 90/24 |
| 3,661,688 | 5/1972 | Wheeler | 264/119 |
| 3,668,029 | 6/1972 | Blossick et al. | 156/659.1 |

FOREIGN PATENT DOCUMENTS

| | | | |
|---|---|---|---|
| 1489710 | 6/1967 | France | |
| 95954 | 5/1972 | France | 156/659.1 |
| 1434268 | 5/1976 | United Kingdom | 156/659.1 |

*Primary Examiner*—Jerome Massie
*Attorney, Agent, or Firm*—John P. Dellett

[57] ABSTRACT

A wood product including a quantity of adhesive coated coarse wood particles disposed between a pair of cellulosic fiber webs is embossed in a heated press by means of a caul plate carrying a plurality of inserts adapted to impress a desired relief design comprising a plurality of adjacent but independent panel configurations in the wood product. The inserts are attached to the caul plate and extend to selected levels for compressing the wood product to different embossing levels characterizing each panel configuration. The individual caul inserts are machined to shape and are separately photo-etched to receive a desired decorative pattern thereon, after which the inserts are assembled onto the caul plate for impressing the wood product. The panel configurations produced in the wood product are suitably separated into substantially rigid, embossed furniture elements or parts having a carved or inlaid appearance.

1 Claim, 10 Drawing Figures

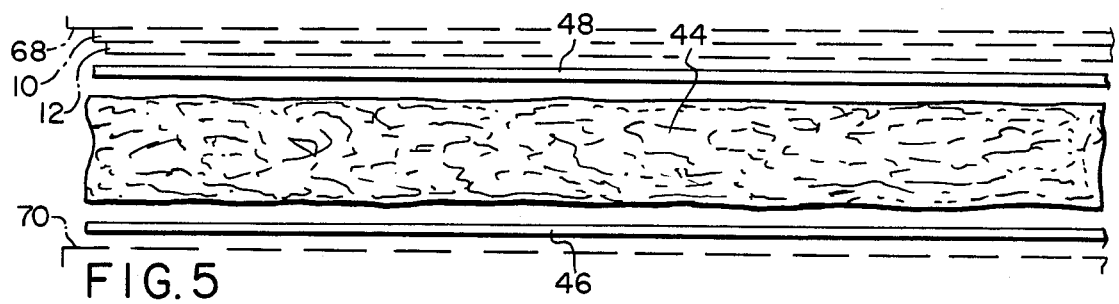
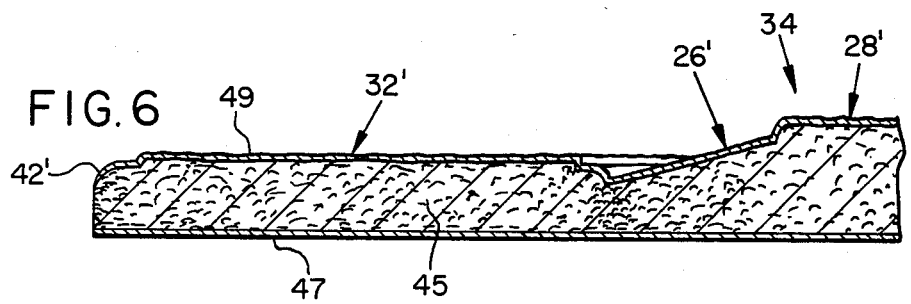
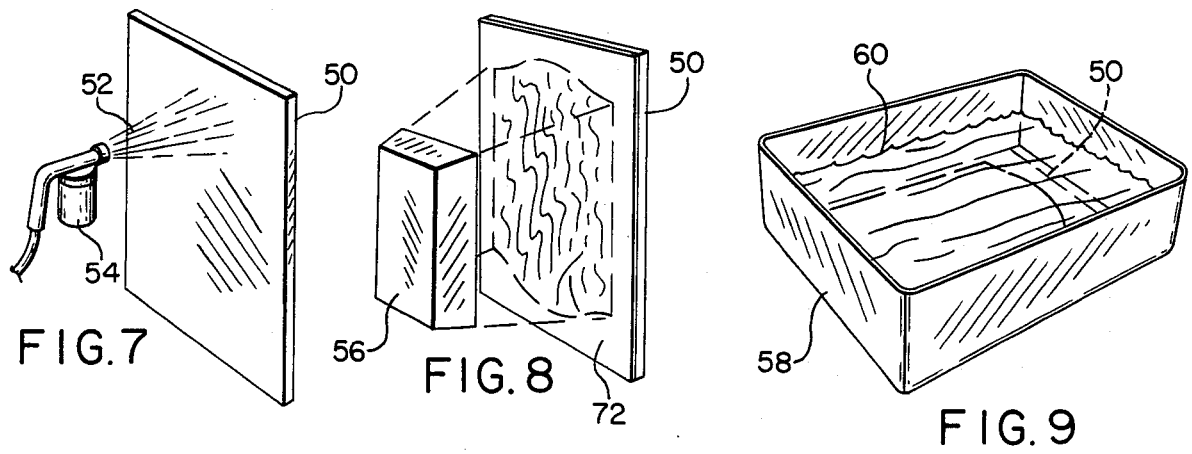
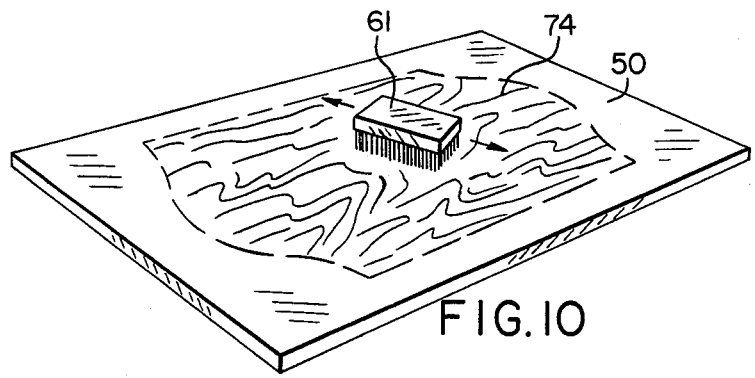

METHOD OF MANUFACTURING AN EMBOSSED PRODUCT

This is a continuation of application Ser. No. 035,278, filed May 2, 1979, now abandoned, which is a continuation of Ser. No. 832,111, filed Sept. 12, 1977, now abandoned.

BACKGROUND OF THE INVENTION

The present invention relates to a method of manufacturing an embossed product, and particularly to such a method for providing an embossed product of improved appearance and durability.

In my U.S. Pat. No. 3,661,668, issued May 9, 1972, a composite board laminate is described which is especially suitable for paneling and the like. The product which is formed from wooden particles covered by cellulosic fiber webs may be provided with grooves and with an overall textured appearance employing a roughened caul plate manufactured according to my U.S. Pat. No. 3,474,706. The roughened appearance is very attractive, especially for exterior use, but in many instances an alternative appearance is preferred in the case of fine furniture design.

Various other kinds of textured patterns have been utilized heretofore for particle board or plywood products. For example, panels have occasionally been formed with a striated surface produced by a multiplicity of grooves smoothly cut, machined or embossed into one face thereof. However, it is not possible by conventional machining operations to supply a surface which is irregular in various surface directions so as to produce a natural appearance.

SUMMARY OF THE INVENTION

In accordance with the present invention, an embossed product in the form of a caul plate or wood product produced therewith is manufactured by shaping a plurality of caul plate inserts for impressing respective components of a relief design, wherein the said inserts are individually photo-etched with decorative surface patterns, for example, wood grain patterns. A photo-resist material is applied to the various inserts, and they are separately exposed to radiation illuminated representations of desired decorative surface patterns. The photo-resist is developed and the inserts are etched to provide the desired decorative patterns on the inserts. The inserts are then assembled onto the caul plate used for impressing a wood product which is suitably formed of a quantity of adhesive coated coarse wood particles disposed between a pair of cellulosic fiber webs and which is impressed to form a plurality of panel configurations separable into embossed, substantially rigid furniture elements or parts. The resultant product has a carved and/or inlaid overall appearance.

Separate photo-etching of the caul plate inserts is of particular advantage in that separate patterns, for example separate wood grains, can be provided on adjoining components of the relief design. Photo-etching a plurality of inserts at the same time would produce registration problems as well as difficulties attributable to the different embossing levels of the inserts.

Accordingly, an object of the present invention is to provide an improved method of manufacturing an embossed product having a more natural appearance.

It is a further object of the present invention to provide an improved method of manufacturing an embossed product characterized by its strength and excellent appearance as well as economy.

It is another object of the present invention to provide an improved method of manufacturing an embossed product capable of producing a plurality of furniture elements or parts at the same time, each characterized by a natural appearance.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 5 is a side view, partially broken away, of the layup of a wood product assembly according to the present invention;

FIG. 6 is a cross-sectional view, partly broken away, of a wood product produced according to the present invention; and FIGS. 7, 8, 9 and 10 illustrate process steps in photo-etching patterns on caul plate inserts according to the present invention.

DETAILED DESCRIPTION

Figure 1:
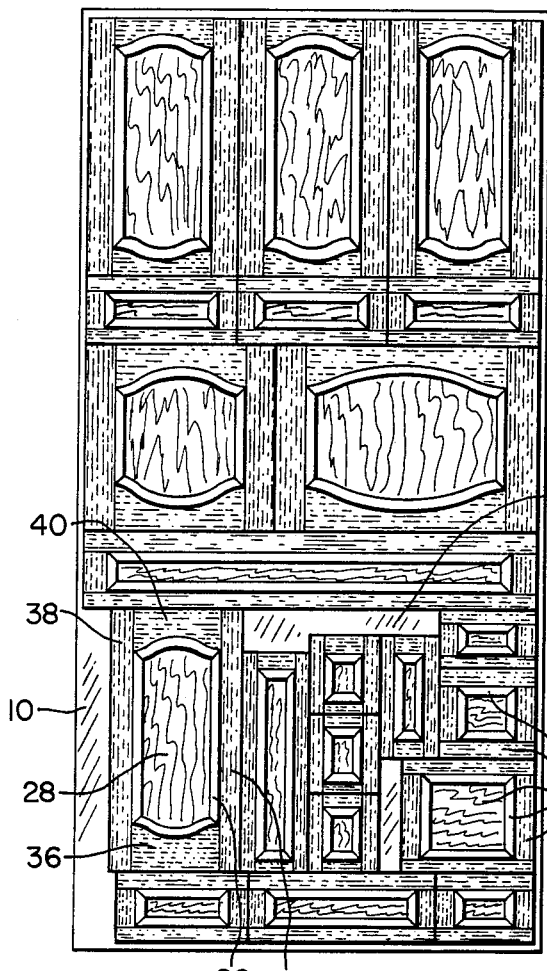
FIG. 1 is a plan view of a caul plate manufactured in accordance with the present invention.
Figure 2:
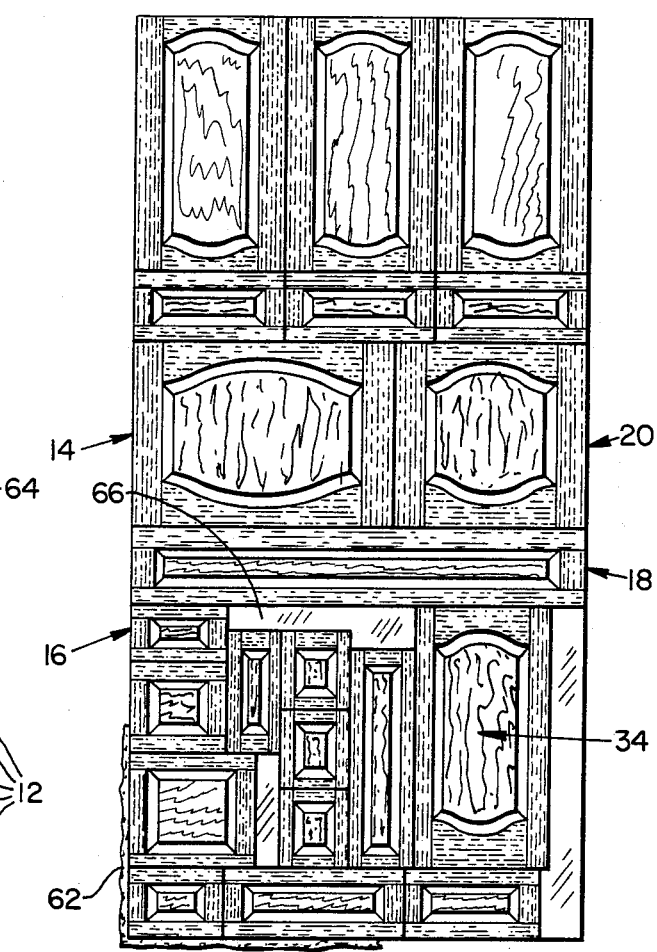
FIG. 2 is a plan view of a wood product formed by the FIG. 1 caul plate.

Embossed products comprising a caul plate and a wood product manufactured by such caul plate are illustrated in FIGS. 1 and 2 respectively. Caul plate 10 is adapted for attachment to a platen of a heated press and comprises a flat steel plate about four feet wide by nine feet long having a plurality of impressing elements in the form of steel inserts 12 attached thereto. These inserts form a mold adapted for impressing a desired relief design in the wood product as illustrated in FIG. 2 comprising a plurality of adjacent but independent panel configurations 14, 16, 18, 20, etc., which are each appreciably smaller than the overall size of the FIG. 2 wood product. Each of these panel configurations may take the form of a door, furniture part or panel which is relatively deeply embossed to give the appearance of a carved furniture element. The panel configurations are suitable for separation into cabinet doors, panels for drawer fronts and the like.

Figure 3:
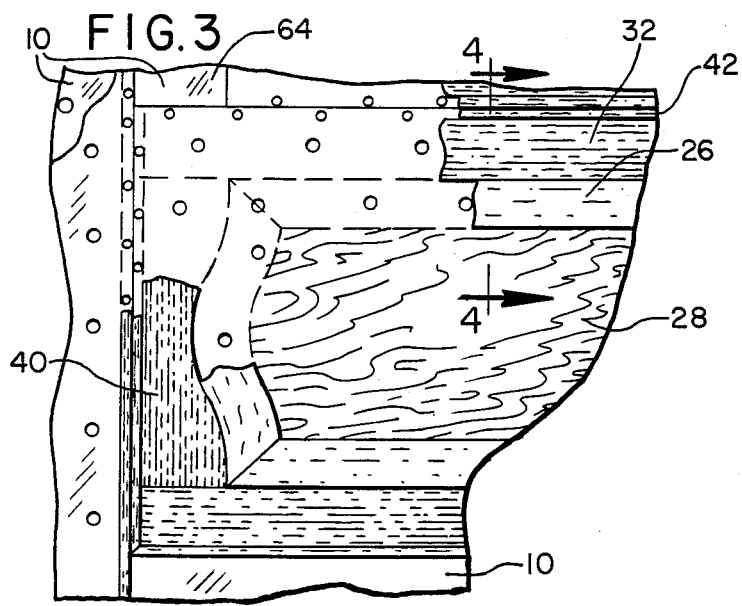
FIG. 3 is a partially broken away, plan view of a portion of the FIG. 1 caul plate, showing the manner of attachment of a plurality of inserts.
Figure 4:
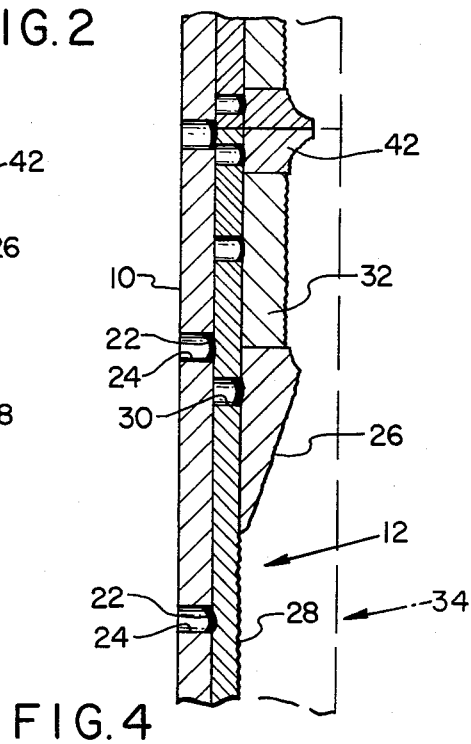
FIG. 4 is a cross-sectional view taken at 4—4 in FIG. 3.

Referring to FIGS. 3 and 4, illustrating portions of caul plate 10 in greater detail, the various inserts 12 are secured to caul plate 10 by means of plug welds 22 in apertures 24 extending through the caul plate. In some instances, an upper insert such as illustrated at 26 is welded in a similar manner to an underlying insert 28. For this purpose, welding apertures such as illustrated at 30 are employed. Insert 28 is in turn welded to the underlying caul plate. The inserts extend to selected levels for compressing the wood product in FIG. 2 to different embossing levels as may characterize each desired embossed panel configuration.

The various inserts are machined to mate with one another in a desired combination. Thus, insert 28 is adapted to form the central panel of a French provincial door or the like as illustrated at 34 in FIG. 2, while insert 26 forms a part of an inner indented border. Side insert 32 impresses an outer door frame surrounding the inner border in conjunction with separate side inserts 36, 38 and 40. The shape of the wood product resulting from operation of the insert mold is illustrated in cross-section in FIG. 6, wherein primed reference numerals are indicative of the caul plate inserts responsible for forming corresponding portions of the wood product.

Border insert 42 is higher than the remainder of the insert combination for a particular panel configuration and is adapted for designating the configuration edge by forming a deep edge groove in the wood product. As further described in my U.S. Pat. No. 3,661,688, issued May 9, 1972, an insert of this type is adapted to round off the edge of a wood product while highly densifying the wood product edge for structural and finish-receiving purposes. Then, the panel configuration can be separated from adjacent panel configurations by sawing along the groove thus established.

Referring to FIG. 5, the wood product (of FIG. 2) is basically formed by disposing a quantity of coarse wood particles 44 between a pair of damp cellulosic fiber webs 46 and 48 to form an assembly which is then impressed by the caul plate. The coarse wood particles are desirably wood shavings coated with an adhesive such as phenolic resin. An example of a suitable resin is a phenol-formaldehyde resin designated GP-3192, manufactured by the Georgia Pacific Corporation, Portland, Oreg. The shavings may be Douglas fir or shavings of any other appropriate wood. For 100 lbs. of coarse wood shavings dry weight or particles, approximately 6 to 8 lbs. of resin solids can be employed and approximately 1 lb. of wax size. The wood particles are dried, e.g. to have a moisture content of about 6 to 15 percent. A sufficient layer thickness of wood particles is employed so that the resulting furniture part or element will have a thickness suitable for a cabinet door, drawer front or the like, with an average density suitably comparable to that of natural wood.

The cellulosic webs are damp webs suitably formed of repulped newsprint, and further including a resin material. The process of forming such a cellulosic fiber web is described in my U.S. Pat. No. 3,748,222, issued July 24, 1973. The general assembly of coarse wood particles between cellulosic fiber webs to form a wood product is described in my aforementioned U.S. Pat. No. 3,661,688, as well as in prior patents mentioned therein assigned to the same assignee. The assembly as illustrated in FIG. 5 is suitably compressed between the platens (indicated 68 and 70) of a standard steam heated press wherein platen 68 carries a caul plate 10 having inserts 12 secured thereto. The platens of such press are heated internally as by steam for raising the temperature of the wood product being formed to a temperature preferably in the range of 275° F. to 350° F. The temperature in general should be higher than the boiling point of water, whereby steam will be formed from moisture primarily contained in the damp webs 46 and 48. However, such temperature should be below the charring point of paper in order that the webs will not become charred.

The pressure applied in the heated press is desirably in the range from 75 to 200 PSI, and is preferably in the neighborhood of 100 PSI or somewhat greater. The heat and pressure are maintained upon the assembly for approximately 10 to 30 minutes, whereby the wood particles are consolidated and densified to provide a solidified core, as illustrated at 45 in FIG. 6, while the surface webs 46 and 48 are compacted and converted to dense, tough, smooth skins 47 and 49 of cellulosic fibers on either side of the core of consolidated wood particles. The exterior of the skin is compressed to be smooth, tough and hard, and receives the desired relief design from the mold formed by the caul plate inserts. These skins become interlocked with the slightly irregular surfaces of the wood particle core thereunder. The wood product is more highly densified where it is more deeply impressed by the mold.

During the 10 to 30 minute period the assembly is within the press, the wood fibers and lignins of the wood particles are softened by the heat and steam and the fibers will slip with respect to one another under pressure, permitting the compaction to a reduced thickness and the release of stresses in the wood core formed thereby. The action of the heat and steam generated within the assembly not only results in compaction of the particles, but also substantially sets or cures the adhesive between the wood particles for tightly and solidly adhering and bonding the same together throughout the compacted particles to form a solid core of reduced thickness. The furniture elements or parts formed thereby are substantially rigid since being formed from the solidified core 45 having a regular and relatively deeply embossed relief design impressed therein.

It will be recognized that the wood product as formed in the press will extend beyond the dimensions of the desired panel configurations leaving a rough edge 62. However, this is removed in the same manner as the various panel configurations are severed from one another along the deep grooves formed in each case by an insert such as insert 42. Also, in the construction of the caul plate, some areas such as indicated at 64 may be left blank, i.e., not having any inserts attached thereto. The resulting wood product will have areas indicated at 66 which do not comprise a particular panel configuration. These areas are severed from the product and may be employed for packing protectors or any other convenient purpose. It should be noted the embossed wood product is substantially formed in one compressing operation, thereby resulting in great economy of production.

In accordance with the process of the present invention, the embossed product is provided with a desired decorative surface pattern, for example a wood grain pattern, so the resulting furniture element, part or the like will have a natural wood appearance. As hereinafter more fully discussed, the respective inserts 12, which are adapted to be attached to caul plate 10, are separately and individually photo-etched to produce a shallow indented grain pattern or other desired pattern thereon which will in turn imprint a slightly raised grain pattern on a portion of a panel configuration (or, of course, vice versa). In general, the various inserts for the caul are first attached as by tack welding to the caul plate 10 for "fit", before being photo-etched. Then, the inserts are all removed from the caul plate and photo-etched individually.

Referring to FIG. 7, insert 50 represents a typical insert as may be adapted for welding to a caul plate, and for receiving other inserts secured to the surface thereof. The insert 50 is suitably machined from mild steel to a shape for forming part of a desired panel configuration, and in the case of this example is similar to central supporting insert 28 in FIGS. 1, 2 and 4. Insert 50 is then attached, as by tack welding, to other inserts which have been separately machined to form their part of the mold, and to the caul plate, so as to ascertain correct fitting appearance of the mold without undesired gaps and the like. Welding apertures have been omitted from insert 50 in FIG. 7 and following for clarity of illustration.

The insert 50 is removed from the caul plate and from the other inserts and is thoroughly cleaned so that it may then receive a photo-resist coating. The photo-resist, 52, is suitably sprayed on the insert by means of a spray gun 54 as illustrated in FIG. 7. In addition to spraying the forward surface of insert 50 which is to receive the desired pattern, the back and edges of the insert should also be protected with photo-resist or other desired material which is etchant resistant. Suitable photo-resists are designated KMER and KTFR manufactured by the Eastman Kodak Company, Rochester, N.Y.

The insert may be "prebaked" for adequately drying the photo-resist. For example, the aforementioned KMER may be prebaked for ten minutes at 130° C., while KFTR may be prebaked for not more than twenty minutes at 80° C. Film transparency 72 bearing a desired decorative surface pattern is now placed in contact with the photo-resist surface on the face of insert 50 as illustrated in FIG. 8, and the photo-resist surface is exposed, through the transparency, to a source of ultraviolet light 56. The transparency may comprise a line representation of a wood grain pattern or other desired pattern, and extends over the surface of the transparency and underlying insert covering an area which will subsequently be exposed to view, i.e., which will not be covered by other inserts. Exposure may be accomplished in a vacuum frame (not shown) if so desired, with such frame affording close contact between the transparency and the photo-resist. As a result of exposure to ultraviolet light, portions of the resist not masked by opaque areas on the transparency will crosslink or polymerize, rendering these areas less soluble than non-exposed areas. Either a negative-working or positive-working resist can be employed, with a corresponding change in the pattern as depicted on the transparency.

Subsequent to exposure, the transparency 72 is removed from insert 50 and the insert 50 is placed in a tank or tray 58 containing a developer at 60. The developer comprises organic solvents as known by those skilled in the art and suitable for use with the respective photo-resist employed. Chlorinated solvents such as trichloroethylene or 1,1,1-trichloroethane are examples. The non-polymerized portions of the photo-resist will be substantially removed leaving a pattern of photo-resist depicting wood grain or the like on the surface of the insert 50. The resist image may be "postbaked" if desired to increase the durability of the image. The "postbake" may be carried out at 120° C. for ten minutes. In many instances, the "postbake" is not necessary.

The insert is now subjected to an etchant as by placing the same in a tank or tray containing a suitable etchant. FIG. 9 is also illustrative of this step in the process, wherein the insert 50 is placed in tray or tank 58, this time containing an etchant at 60. Suitable etchants include a solution of ferric chloride 36- to 42-degree Baumo, nitric acid or a solution of both as known to those skilled in the art. The etching may be accomplished in steps each of a few minutes duration, while removing the insert between steps to observe whether etching has taken place to the desired depth so that a shallow indented pattern will appear, for example, representative of a slightly raised grained pattern on the finished wood product. After the desired etching has taken place, the etchant and the adhered photo-resist are removed from the insert. As an example, the same may be removed with a bristle brush 61 as illustrated in FIG. 10, or an appropriate stripper may be employed, leaving the underlying surface pattern 74 thereon adapted for compressing such pattern on a portion of the completed wood product.

Other inserts are provided with a decorative pattern by separately etching the same in a similar manner, after which the inserts are reassembled on the caul plate substantially as illustrated. The complete caul is then ready for utilization in impressing wood products such as illustrated in FIG. 2 and as hereinbefore described. The completed product is adapted to receive a finish and will result in the appearance of grained wood or the like.

Individually photo-etching the inserts provides several advantages. First, it is desired to provide different patterns on the various panel configuration portions as might, in a solid wood product, be formed from individual boards or pieces. For instance, referring to FIGS. 1 and 3, inserts 32, 36, 38 and 40 are each characterized by a wood grain pattern extending longitudinally of the particular insert for producing similar patterns on the wood product, giving the impression of a border formed from four separate boards. Consequently, the grained pattern on the respective inserts 32, 36, 38, and 40 are independent of one another and desirably produced independently for optimizing the natural effect. Secondly, an effort to photo-etch a plurality of inserts at the same time would not only produce registration problems if different adjoining patterns were to be employed, but also the different levels of the inserts forming a mold would produce difficulty in proper application of a pattern transparency to the inserts, or would produce difficulty in focusing an image. Separately photo-etching the respective inserts is adapted to produce a true pattern representation. It should be noted the inserts are for the most part substantially flat faced or include a flat face that may receive a substantially flat pattern-bearing transparency thereagainst. Thirdly, an attempt to etch several inserts of a mold at the same time would tend to have an undesirable effect on the joints or boundaries between inserts where undesired etchant attack might take place. As a result of the present invention, an attractive furniture product is produced.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

What is claimed is:

1. A method of manufacturing an embossed product comprising:
    disposing a quantity of adhesive coated coarse wood particles between a pair of cellulosic fiber webs to form an assembly, locating said assembly between the platens of a heated press provided with at least one caul plate having a first surface carrying a mold adapted for impressing a desired relief design comprising a plurality of adjacent but independent panel configurations onto said assembly, said mold comprising a plurality of individual inserts mating together to form each panel configuration wherein ones of said inserts are provided with differing substantially flat faced upper surfaces and flat lower surfaces, said inserts extending to selected levels for compressing said assembly to different embossing levels characterizing each such panel configuration to provide separately simulated carved wood elements formed by separate inserts, and wherein the flat lower surfaces of ones of said inserts are adapted to fit and slide on said first surface of said caul plate and the flat lower surfaces of other of said inserts are adapted to fit and slide on upper surfaces of inserts therebelow, including machining said individual inserts to mate together for impressing the relief design, attaching said individual inserts to said caul plate and to other inserts as the case may be in adjacent edge abutting interfitting relation by tack welding, disengaging said inserts from said caul plate, applying a photo-resist material to individual inserts, separately exposing substantially flat faced upper surfaces of individual inserts through radiation illuminated flat transparencies of wood grain surface patterns, developing the photo-resist, etching said inserts to provide the desired surface grain patterns thereon, and re-attaching said inserts by welding onto said caul plate and to other inserts as the case may be in mating relation at their original positions to provide closely adjoining grain patterns, said grain patterns forming an overall pattern on a said panel configuration, ones of said inserts having grain patterns closely adjacent but non-matching to the grain patterns on the adjacent insert, exerting pressure in said press to compress said assembly into the form of a wood product having said relief design, and severing said independent panel configurations from one another.

* * * * *

UNITED STATES PATENT AND TRADEMARK OFFICE
CERTIFICATE OF CORRECTION

PATENT NO. : 4,544,440
DATED : October 1, 1985
INVENTOR(S) : Robert G. Wheeler

It is certified that error appears in the above-identified patent and that said Letters Patent is hereby corrected as shown below:

Column 5, line 26, "KFTR" should be --KTFR--;
        line 68, "Baumo" should be --Baume--.

Signed and Sealed this
Ninth Day of December, 1986

*Attest:*

DONALD J. QUIGG

*Attesting Officer*      *Commissioner of Patents and Trademarks*